United States Patent [19]
Lubin

[11] Patent Number: 5,364,194
[45] Date of Patent: Nov. 15, 1994

[54] AXIALLY DISPLACED FLEXURAL BEARING SUPPORT

[75] Inventor: James K. Lubin, Pacifica, Calif.

[73] Assignee: Ampex Systems Corporation, Redwood City, Calif.

[21] Appl. No.: 67

[22] Filed: Jan. 4, 1993

[51] Int. Cl.$^5$ ............. F16C 17/22; F16C 27/00
[52] U.S. Cl. ................. 384/493; 384/215; 384/535
[58] Field of Search .......... 384/493, 495, 535, 536, 384/517, 557, 215, 192, 902

[56] References Cited

U.S. PATENT DOCUMENTS

| | | | |
|---|---|---|---|
| 1,071,183 | 8/1913 | Satzinger . | |
| 1,970,992 | 8/1934 | Wiberg | 384/215 |
| 2,532,327 | 12/1950 | Parks . | |
| 2,885,583 | 5/1959 | Zunick et al. | 384/535 X |
| 3,604,765 | 9/1971 | Babcock | 384/192 |
| 3,759,626 | 9/1973 | Becker | 384/535 X |
| 3,777,195 | 12/1973 | Potter | 384/493 X |
| 4,226,485 | 10/1980 | Pruvot | 384/557 |
| 4,235,483 | 11/1980 | Schulze . | |
| 4,564,300 | 1/1986 | Schulze | 384/581 |

FOREIGN PATENT DOCUMENTS

| | | | |
|---|---|---|---|
| 578710 | 10/1924 | France | 384/215 |
| 1225188 | 6/1960 | France | 384/215 |
| 6789 | 4/1922 | Netherlands . | |
| 62892 | 4/1949 | Netherlands | 384/215 |
| 581879 | 10/1946 | United Kingdom | 384/517 |
| 631157 | 10/1949 | United Kingdom | 384/215 |

*Primary Examiner*—Thomas R. Hannon
*Attorney, Agent, or Firm*—John G. Mesaros

[57] ABSTRACT

An apparatus for an axially displaced flexural bearing support assembly including a unitary or monolithic bearing support base member having a bearing receiving tube supported by a first and second generally parallel arrangement of flexural spoke members to control bearing pre-load due to axial differential expansion while eliminating radial displacement of the spindle or shaft supported within the tube. The spoke members of each arrangement include a plurality of spoke members arranged in parallel planes generally perpendicular to the axis of a spindle insertable within and supported within the tube by means of bearings. In the preferred embodiment, there are three spokes for each set in each plane, with the spokes being equiangularly displaced. To facilitate casting as a monolithic unit, one set of spokes is offset from the other by an angle half the angle between spokes, that is sixty degrees, and further, the width of the spokes is such that no spoke portion overlies any other spoke portion, as viewed from a line along the axis. The assembly also includes a generally hollow housing portion having a second bearing receiving opening, the housing and the base support member being configured for pinning together to permit finish boring of the two coaxially aligned bearing support members at the same time to the same tolerance to ensure alignment of the centers of the openings for receiving the bearings and spindle therein. The housing is configured for receiving a scanner drive motor therein.

10 Claims, 7 Drawing Sheets

AXIALLY DISPLACED FLEXURAL BEARING SUPPORT

FIELD OF THE INVENTION

This invention relates generally to bearing supports, and more particularly to a flexural bearing support assembly which comprises a bearing support base member having a pair of parallel flexural element arrangements which function to permit axial movement of an associated shaft or spindle but restrict radial movement.

BACKGROUND OF THE INVENTION

In the storage and retrieval of information, digital tape recording and reproducing apparatus has been employed. Such apparatus of more recent vintage includes a scanner assembly, in which the scanner spindle must be relatively free of radial movement to ensure that the scanning heads traverse a predictable and repeatable path. Such scanning heads operate at normal rotational speeds in excess of 5,400 revolutions per minute and, during variable play or search operation, may run at speeds up to 9,000 RPM. With track widths in such digital tape machines presently in the 20 to 40 micron range, it is imperative that the spindle assembly maintain a consistent and unchanging positional relationship to the tape guiding reference features of the tape drive. Axial compliance between the bearing pair is required to allow for differential thermal expansion between the shaft or spindle and housing. Radial play must be eliminated, for this will translate into a change in the scan plane relative to the remainder of the tape drive.

Figure 1A:
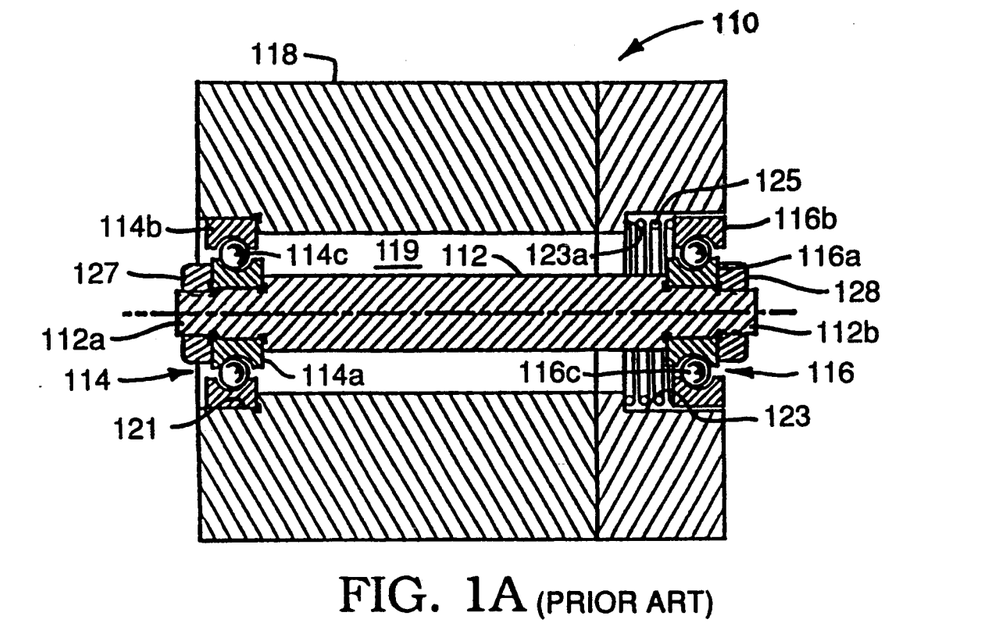
FIGS. 1A and 1B are diagrammatic cross-sectional views of a prior art compression spring pre-loaded spindle assembly illustrating radial displacement of the spindle axis.
Figure 1B:
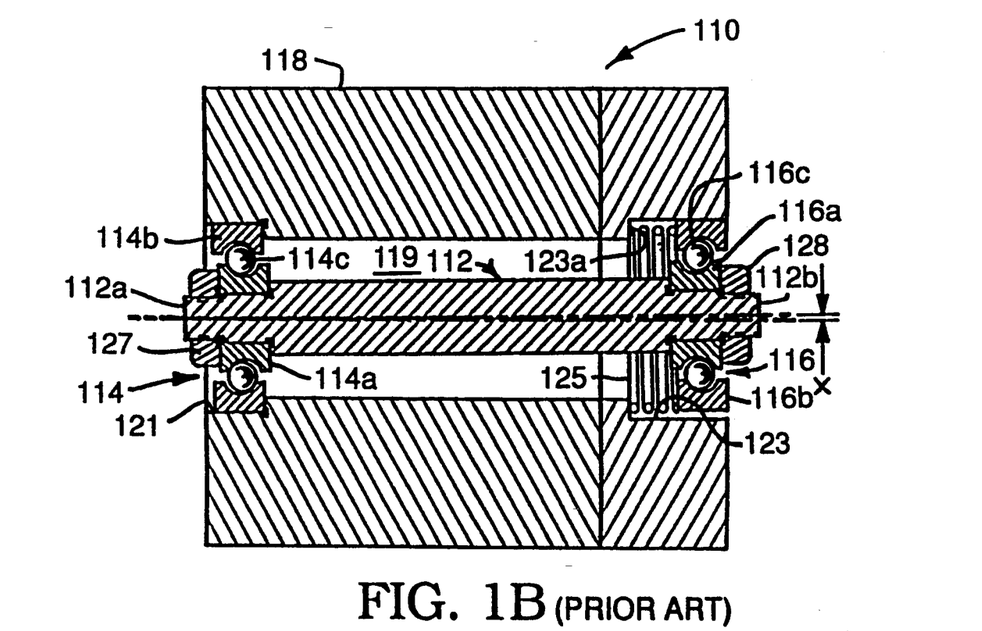

In prior art spindle assemblies, spring pre-loaded spindle assemblies have been employed. One such unit, generally designated 110, is shown in FIGS. 1A and 1B, in which a rotatable shaft 112 has first and second reduced diameter ends 112a and 112b thereof supported by the fixed attachment to the inner races 114a and 116a of ball bearing assemblies, generally designated 114 and 116, the inner races being secured to the shaft 112 by suitable means such as nut members 127 and 128. The outer races 114b and 116b of the bearing assemblies 114 and 116 are suitably supported within a housing or other support member, generally designated 118, which includes a central tubular opening 119 through which the shaft 112 extends in concentric relation therewith. The outer race 114b of bearing assembly 114 is securely mounted within an enlarged opening 121 configured for securely receiving therein the outer race 114b, which is fixed within the enlarged diameter opening 119 by adhesive or by a press fit. The other end of the tubular opening 119 is provided with a second enlarged diameter opening 123 having a greater depth than the opposite opening 121. Assembled within the opening 123 is a compression pre-load spring 125, the outer diameter of which approximates the inner diameter of the opening 123. One end of spring 125 rests against the shoulder 123a of opening 123, while the other end urges against the inner surface of the outer race 116b of bearing 116. The outer race 116b is loosely retained within the opening 123, that is, the inner diameter of opening 123 is slightly greater than the outer diameter of outer race 116b, providing a radial gap which is required to allow axial compliance for pre-load control. The shaft ends 112a and 112b have a diameter sufficient to receive thereon the openings of the inner races 114a and 116a of bearings 114 and 116, respectively. As can be seen by viewing the ball bearings 114c and 116c of the bearings 114 and 116, the effect of the pre-loading is to urge the outer races 114b and 116b away from one another, that is the dimension between the inner surfaces of inner races 114a and 114b is less than the dimension between the opposing inner surfaces of outer races 114b and 116b. This effect causes the bearing positions to be closer to the outer edges of the inner bearing races 114a and 116a, and correspondingly, closer to the inner edges of the outer bearing races 114b and 116b. Such pre-loading of spindle assemblies has been done in an attempt to eliminate axial motion of the spindle at the fixed bearing 114 while still allowing for differential thermal expansion between the housing and shaft by extension or compression of the pre-load spring 125 and slight relative motion between the housing 118 and the "floating bearing" 116.

As shown in FIG. 1A, the outer diameter of outer race 116b of bearing 116 is concentric with the opening 123. However, upon rotation, and especially under load, there is a bearing radial shift of bearing 116, that is, the bearing which coacts with the pre-load compression spring 123. This effect is undesirable and results in loss of axis control since any radial shift will cause an angular displacement of the axis of the shaft 112 relative to the housing mount or support member 118, this angular displacement being represented by the distance between the two broken axial lines having an angular displacement distance "X" therebetween.

In accordance with an aspect of the present invention, there is provided an axially displaced flexural bearing support assembly including a unitary or monolithic bearing support base member having a bearing receiving tube supported by first and second generally parallel flexural spoke members which allows both outer races to be fixed by adhesive or press fit to their respective bearing bores, thus eliminating the radial clearance while the flexural spring characteristics of the spoke members allow sufficient axial compliance to prevent bearing overload due to thermal differential expansions.

The present invention obviates many of the disadvantages of the prior art and provides further related advantages.

SUMMARY OF THE INVENTION

The foregoing and other objects of the invention are accomplished by providing an axially displaced flexural bearing support assembly including a unitary or monolithic bearing support base member having a bearing receiving tube supported by a first and second generally parallel arrangement of flexural spoke members to allow for thermal differential axial expansion while eliminating radial clearance between the outer bearing races and the housing. The spoke members of each arrangement include a plurality of spoke members arranged in parallel planes generally perpendicular to the axis of a spindle insertable within and supported within the tube by means of bearings. In the preferred embodiment, there are three spokes for each set in each plane, with the spokes being equiangularly displaced. To facilitate casting as a monolithic unit, one set of spokes is offset from the other by an angle half the angle between spokes, that is sixty degrees, and further, the width of the spokes is such that no spoke portion overlies any other spoke portion, as viewed from a line along the axis. The assembly also includes a generally hollow housing portion having a second bearing receiving opening, the housing and the base support member being configured for pinning together to permit finish boring of the two coaxially aligned bearing support members at the same time to the same tolerance to ensure alignment of the centers of the openings for receiving the bearings and spindle therein. The housing is configured for receiving a scanner drive motor therein.

Other features and advantages of the present invention will become apparent from the following detailed description, taken in conjunction with the accompanying drawings in which like reference numerals refer to like elements in the several views.

DESCRIPTION OF THE PREFERRED EMBODIMENT

Figure 2:
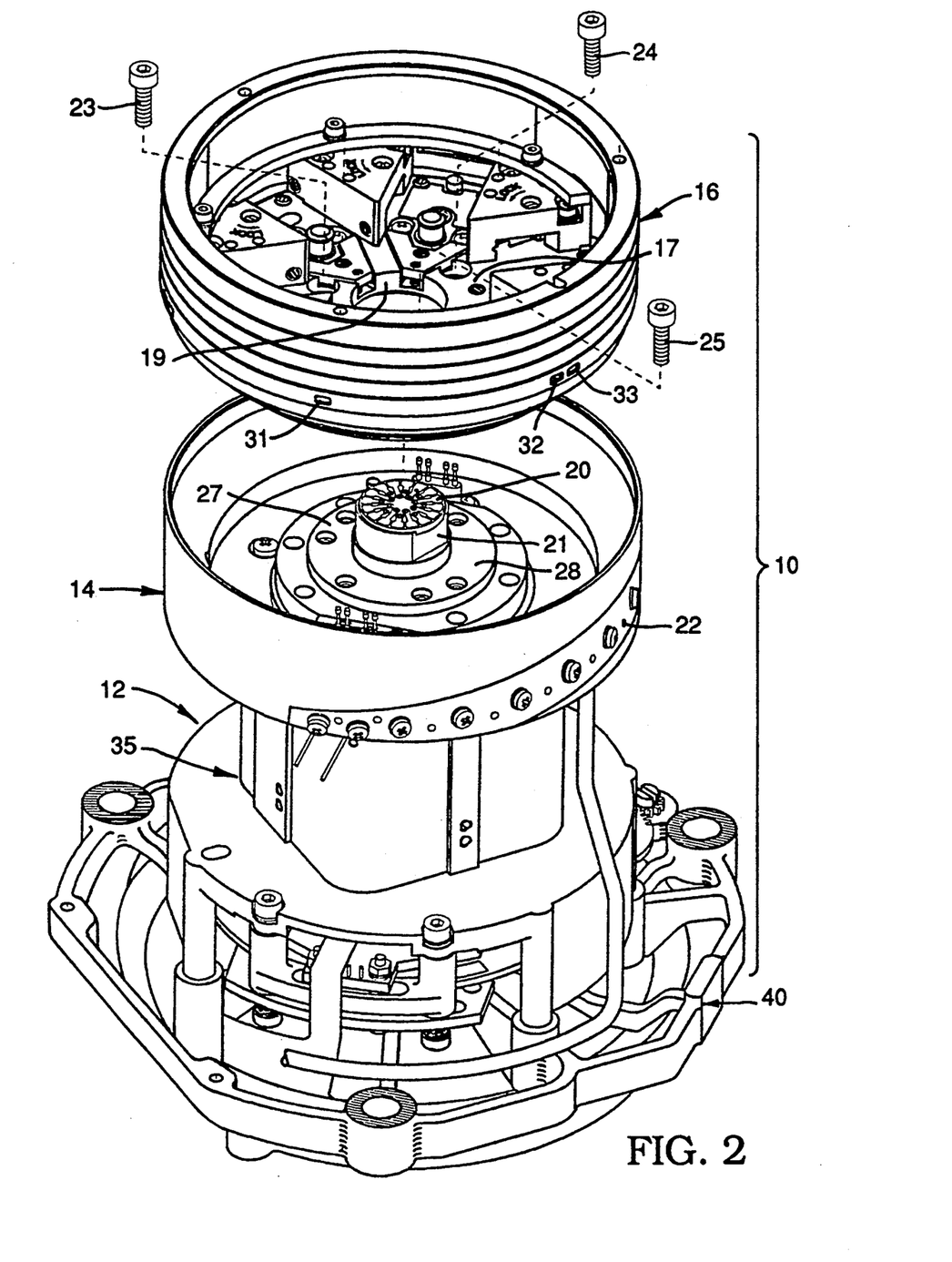
FIG. 2 is an exploded perspective view of a portion of a rotary scanner assembly incorporating the axially displaced flexural bearing support assembly according to the invention.
Figure 3:
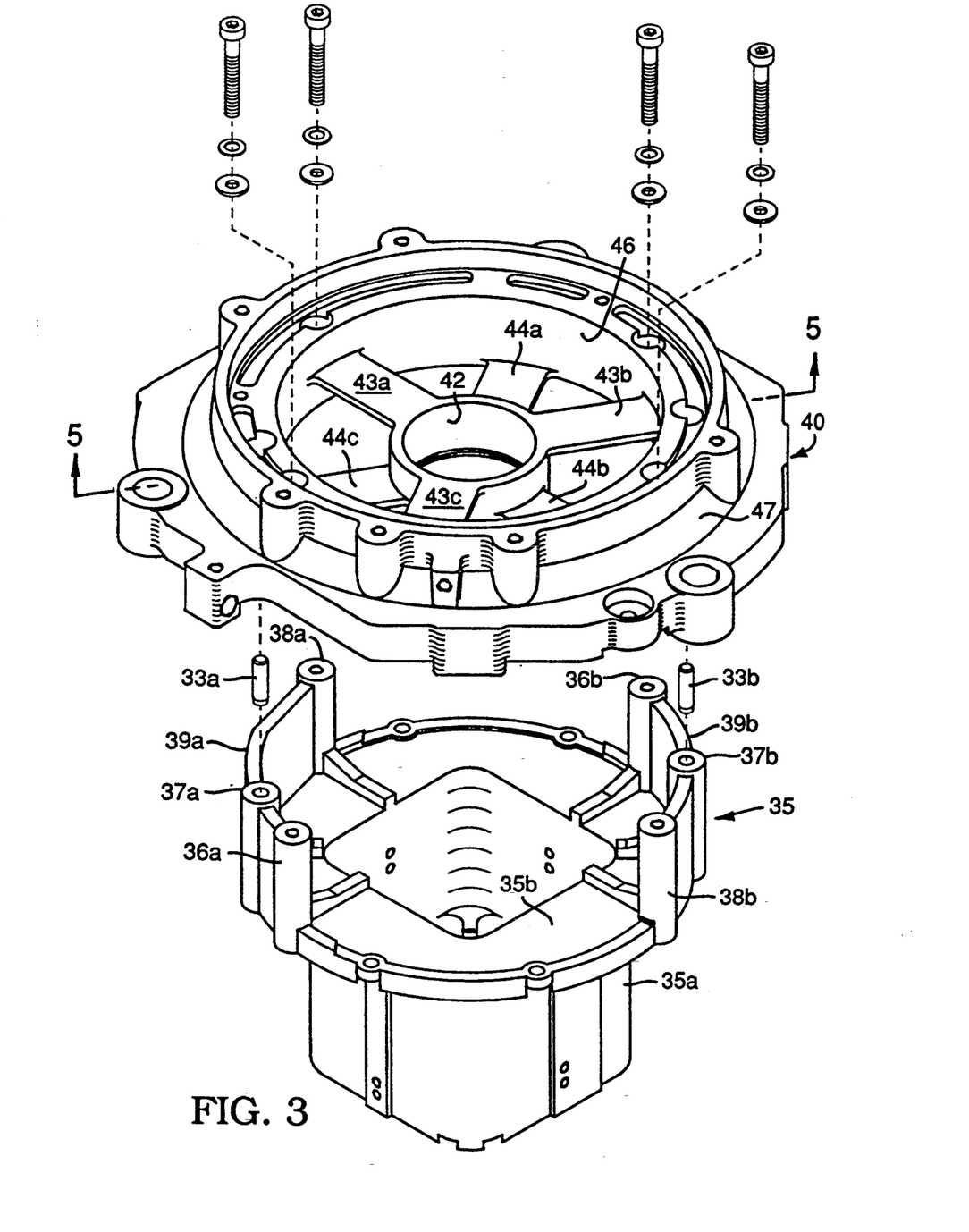
FIG. 3 is an exploded perspective view of the flexural bearing support assembly components used in the assembly of FIG. 2, and shown in inverted relation thereto.
Figure 4:
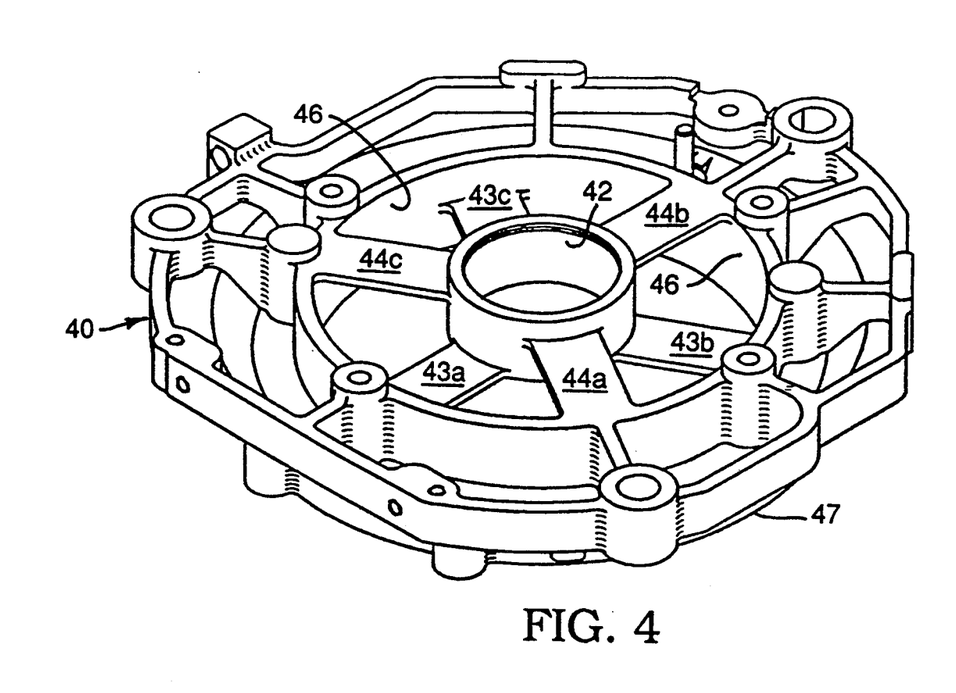
FIG. 4 is a perspective view of the monolithic bearing support base member shown in FIG. 3, but in an inverted position.

Referring now to the drawings, and particularly to FIG. 2, by way of background information, there is shown a partial tape drive scanner assembly, generally designated 10, which includes a motor housing, generally designated 12, a lower tape drum 14 and an upper drum or rotary scanner 16. The lower drum 14 is generally cylindrical and is secured in fixed relation to the housing 12, concentric with a shaft or spindle 20, only the upper end of which is shown. Secured about a part of the periphery of the outer surface of the lower tape drum 14 is a tape guide 22, which defines a helical path for the magnetic tape, one edge of which follows the upper edge of the tape edge guide 22. The lower drum 14 is stationary, while the rotary scanner is adapted to be driven by the spindle and the motor (not shown) within the housing 12. The scanner 16 is secured, via screw members 23–25 to a collar or flange 28 secured for rotation with spindle 20. The scanner 16 is somewhat cup-shaped and of cylindrical configuration with a bottom 17 having an aperture 19 therein, the aperture 19 being of generally circular cross-section with a flat portion to form a key for keying of the scanner 16 to the flat part 21 of the spindle 20. The heads or transducers for the scanner 16 are not shown but pockets are provided on the interior of the scanner 16 for receipt of the same. The heads operate through openings 31–33 through the wall of the scanner in a manner known to those skilled in the art. A detailed explanation of the heads and the scanner openings is not essential to an understanding of the present invention.

Referring also to FIGS. 3 through 7, FIG. 3 shows the component parts which form the housing, these being the bearing and motor housing, generally designated 35, and the bearing support base member, generally designated 40. The housing 35 has a generally box-like first housing portion 35a the upper end of which (as viewed in FIG. 3) having an enlarged flange portion 35b, which is generally circular or disc-like. Protruding upwards from the rim of the flange portion 35b are two sets of diametrically opposed bosses 36a–38a and 36b, 38b, respectively. The bosses are interconnected by a web portion 39a, 39b, the curvature of which defines an arc. The center ones of the sets of bosses, that is bosses 37a and 37b are configured for receiving pins 33a and 33b, for enabling precision alignment of the parts 35 and 40.

The bearing support base member 40 has a centrally disposed hub or bearing receiving tube 42, with two sets 43 and 44 of radially extending spokes extending outwardly therefrom, with each set lying in a different parallel plane. The first set of spokes 43a, 43b and 43c lie in a plane which is coplanar with one end of the opening of the tube 42. The second set of spokes 44a, 44b and 44c lie in an axially displaced plane (See especially FIG. 4), the center of which is displaced a distance which is approximately 75% of the depth of the tube 42. The distal ends of the spoke sets 43 and 44 terminate at the interconnections thereof with a larger diameter ring portion 46, outwardly of which is an enlarged peripheral flange portion 47 in which are cast or molded fastening and alignment recesses and apertures. Each spoke set has the spokes thereof equiangularly extending from the tube 42, that is, for three spokes, an angle of 120 degrees. One spoke set (43, 44) has the spokes thereof circumferentially displaced relative to those of the other set (44, 43), this being an angle of sixty degrees. That is to say that the spokes of one set are angularly offset from those of the other set by an angle which is one-half the angle between adjacent spokes of the same set.

Figure 7:
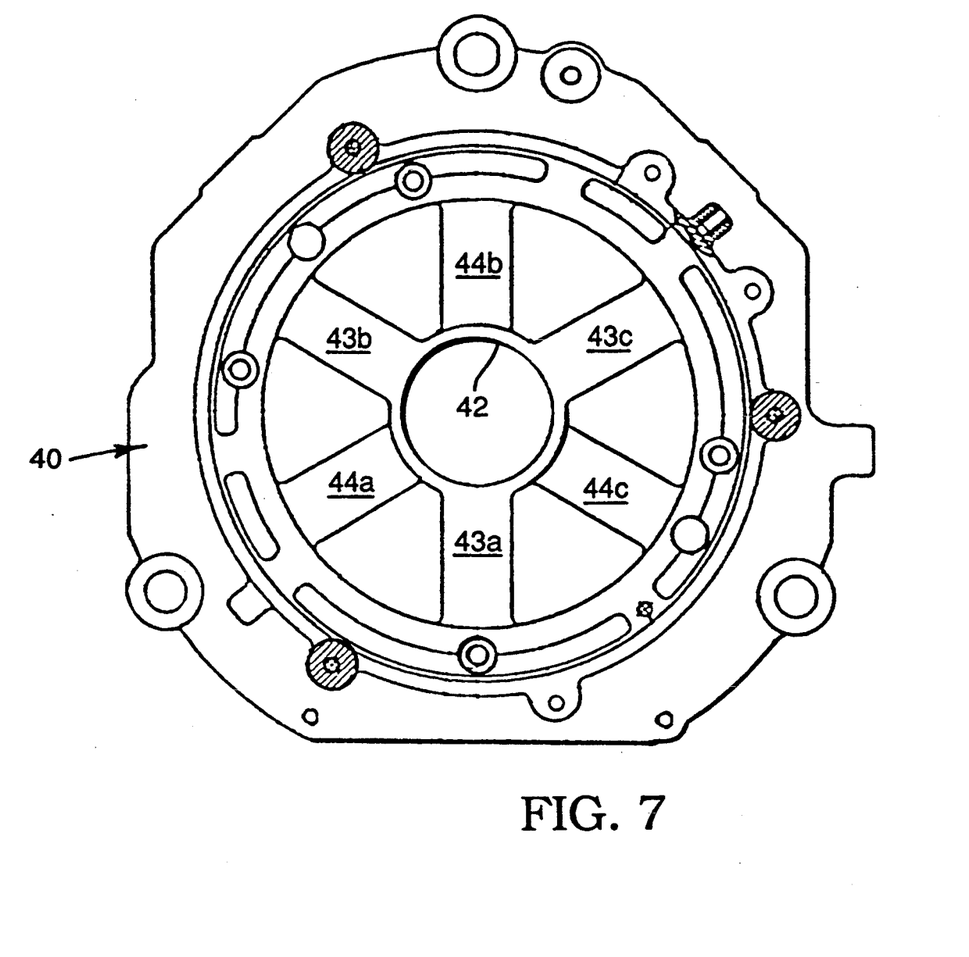
FIG. 7 is a plan view of the monolithic bearing support base member shown in FIG. 3 as viewed from the top of the figure.

As best shown in FIG. 7, the spokes have a width such that no spoke overlies a next spoke when viewed along the axis of the tube 42. The support member 40 is monolithic, that is formed as one piece, preferably of cast metal, such as an aluminum alloy. While the spoke sets need not be angularly offset relative to one another for the invention, to do so facilitates casting of the part and provides rigidity for final machining processes. The spokes provide flexural support for the tube 42 and ultimately for the bearing and spindle 20, with the relatively small cross-sections of the spokes permitting axial movement and a certain amount of deflection as a consequence of thermal expansion, without radially displacing the tube 42. This construction controls bearing pre-load by compliant flexure of spoke sets 43, 44 to allow for thermal expansion, while eliminating radial play/clearance between housing and bearing outer diameter. The flexural elements, that is, the spoke sets 43, 44 being displaced axially provide increased trunion or tube 42 stiffness for fabrication operations and during spindle operation.

By way of example, with a proposed speed range of 5,400 to 9,000 rpm of the spindle or shaft 20, dimensionally the spokes are about 60 to 64 thousandths of an inch thick, with a width of about one half inch. The inner diameter of tube 42 is about 1.17 inch, with the inner diameter of the outer ring being less than three and one half inches. The overall size of the part 40 is about five and one-half inches in diameter and about one inch thick. The bearing base support member 40 has been constructed in such a way that the selection of flexure or spoke cross-section provides vibration isolation at specific known frequencies, while maximizing the frequency of undesired mode shapes, such as trunnion mode, which produces flexural dynamic instability. Simultaneously, the construction allows the axial flexural stiffness to be minimized for greatest thermal range of bearing pre-load control.

Figure 5:
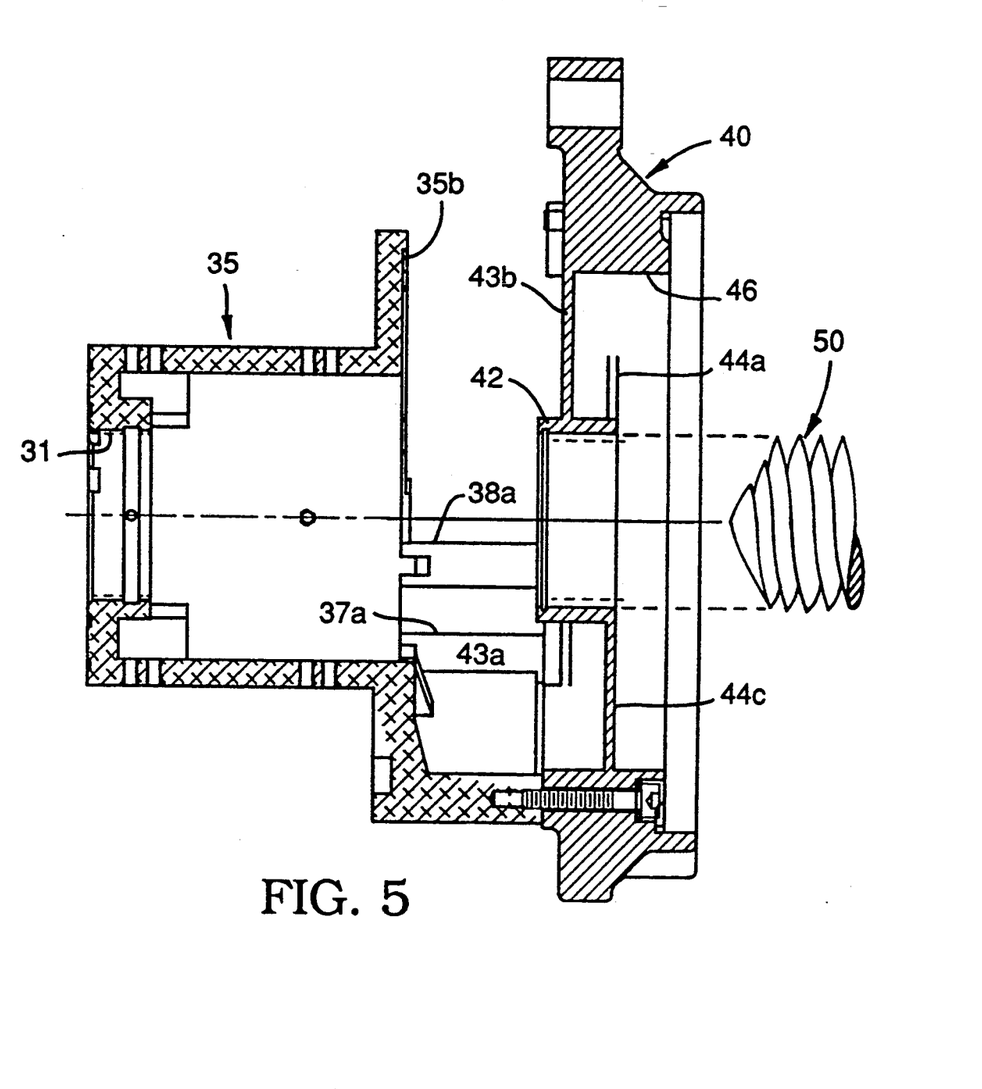
FIG. 5 is a cross-sectional view of the bearing support assembly, as assembled from the components of FIG. 3, as viewed generally along line 5—5 thereof.

FIG. 5 shows the two parts of the flexural bearing support assembly in its assembled condition, that is, with base support 40 pinned and fastened to housing 35. During fabrication, the inner diameter of the bearing tube 42 and the inner diameter of the upper spindle shaft support bearing opening 31 are the same. With the housing 35 assembled to the base support member 40, final milling of the two bearing openings can be accomplished at the same time by a suitable bore 50 being passed axially through both openings while the assembled unit is held or clamped in a suitable fixture (not shown). Thus the construction of the assembly allows line boring with the parts joined together in an as assembled configuration, pinned together for matched set alignment, with the bearing bores or openings machined to the final size. This process insures that the bearing journals or openings are as close to co-linear as the machine tool can generate.

Figure 6:
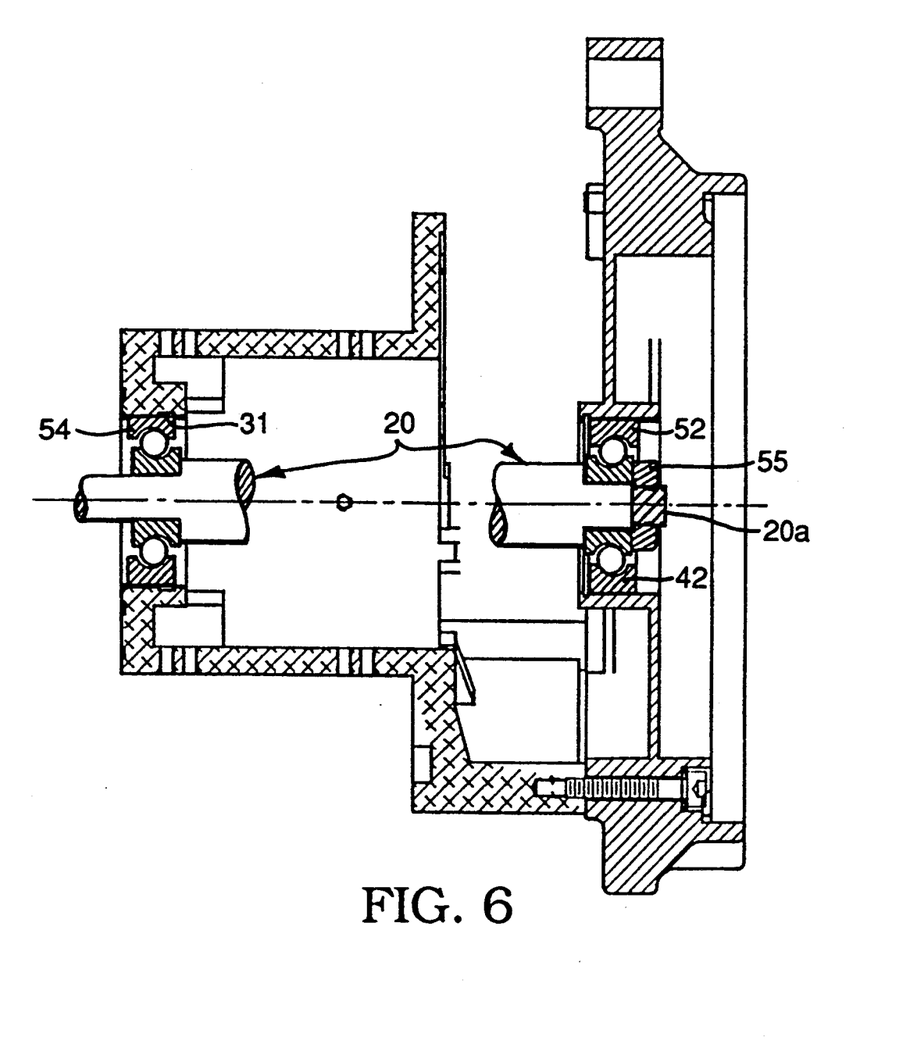
FIG. 6 is a view similar to FIG. 5 with the bearings and spindle shown therein, the bearings and spindle being partially broken away.

FIG. 6 duplicates the view of FIG. 5 with the spindle 20 (part of which is cut away) in place between roller bearings 52 and 54 fixedly attached within openings 42 and 31, respectively. A pre-load may be applied to the spindle 20 by means of a nut 54 engaging the threaded end 20a of spindle 20. The construction of the present invention, which relates to pre-load and dynamic control of a precision spindle assembly using roller element bearings for application to a tape drive scanner spindle assembly has other applications, such as for a disc drive spindle assembly, a machine tool spindle assembly, or a spindle assembly for any other apparatus in which radial displacement of the shaft is undesirable, whether under load or as a consequence of thermal gradients or both.

In accordance with the invention, there has been shown and described a bearing support assembly which controls bearing pre-load by compliant flexure to allow for thermal expansion, while eliminating radial play/clearance between the housing and bearing outer diameter. In the embodiment described, the flexural spoke elements are arranged in sets which are displaced axially resulting in increased trunnion stiffness for fabrication operations and during spindle operation. The flexure controls bearing trunnion attitude while allowing axial displacement for thermal expansion. While the embodiment illustrated utilizes three equiangularly arranged spokes per set, with a half angle offset between adjacent sets, it is to be understood that the number of spokes—their length, width and thickness may all be adjusted within design constraints to achieve desired properties. While there has been shown and described a preferred embodiment, it is to be understood that various other adaptations and modifications may be made without departing from the spirit and scope of the invention.

I claim:

1. A bearing and spindle support assembly comprising a monolithic bearing support base member having a bearing receiving tube of a given length supported by a first and second generally parallel sets of flexural spoke members configured, dimensioned and arranged to minimize radial displacement of the spindle or shaft supported within the tube while allowing axial compliance and pre-load control due to thermal differential expansion, one set of said spoke members being attached at first ends thereof to said tube adjacent one end thereof; said other set of said spoke members being attached at first ends thereof to said tube at a point displaced from the other end of said tube a distance of about one quarter said length.

2. The assembly according to claim 1 wherein each set includes three equiangularly positioned spoke members.

3. The assembly according to claim 2 wherein one set of spokes is offset from the other by an angle half the angle between spokes.

4. The assembly according to claim 3 wherein each spoke of each set is generally identical.

5. The assembly according to claim 4 wherein the dimensions of each spoke are such that no spoke portion overlies any other spoke portion, as viewed from a line along the axis.

6. The assembly according to claim 1 wherein said assembly further includes a generally hollow housing portion having a second bearing receiving opening, the housing and the base support member being configured for pinning together to permit finish boring of the two coaxially aligned bearing receiving openings at the same time to the same tolerance to ensure alignment of the centers of the openings for receiving the bearings and spindle therein.

7. A bearing and spindle support assembly comprising:
   a generally hollow housing having a bearing receiving opening;
   a monolithic bearing support member having a second bearing receiving opening within a tube of a given length supported by first and second sets of flexural members arranged in parallel planes with each set lying in a given plane, with the flexural members allowing axial pre-load control in the presence of differential thermal expansion while eliminating radial displacement of the spindle or shaft supported within the tube, said first set of said flexural members being equiangularly displaced spoke members attached at first ends thereof to said tube adjacent one end thereof; said second set of said flexural members being a like set of spoke members attached at first ends thereof to said tube at a point displaced from the other end of said tube a distance of about one quarter said length; and means for coupling said housing and said support member together with said openings aligned for supporting a spindle and bearing assembly.

8. The assembly according to claim 7 wherein each set includes three spokes, each spoke being generally identical in configuration.

9. The assembly according to claim 8 wherein one set of spokes is offset from the other by an angle half the angle between spokes.

10. The assembly according to claim 7 wherein the housing and the base support member are configured for pinning together to permit finish boring of the two coaxially aligned bearing support openings at the same time to the same tolerance to ensure alignment of the centers of the openings for receiving the bearings and spindle therein.

* * * * *